US012243675B2

(12) United States Patent
Nagai et al.

(10) Patent No.: US 12,243,675 B2
(45) Date of Patent: Mar. 4, 2025

(54) MULTILAYER COIL COMPONENT

(71) Applicant: TDK CORPORATION, Tokyo (JP)

(72) Inventors: Yusuke Nagai, Tokyo (JP); Takashi Suzuki, Tokyo (JP); Kazuhiro Ebina, Tokyo (JP); Kunihiko Kawasaki, Tokyo (JP); Shinichi Kondo, Tokyo (JP); Keito Yasuda, Tokyo (JP); Ryuichi Wada, Tokyo (JP); Makoto Morita, Tokyo (JP); Takashi Kudo, Tokyo (JP); Kyohei Tonoyama, Tokyo (JP)

(73) Assignee: TDK CORPORATION, Tokyo (JP)

( * ) Notice: Subject to any disclaimer, the term of this patent is extended or adjusted under 35 U.S.C. 154(b) by 703 days.

(21) Appl. No.: 17/490,893

(22) Filed: Sep. 30, 2021

(65) Prior Publication Data

US 2022/0108836 A1 Apr. 7, 2022

(30) Foreign Application Priority Data

Oct. 2, 2020 (JP) ................................ 2020-167762

(51) Int. Cl.

*H01F 5/00* (2006.01)
*H01F 17/00* (2006.01)
*H01F 17/04* (2006.01)
*H01F 27/29* (2006.01)

(52) U.S. Cl.

CPC ....... *H01F 27/292* (2013.01); *H01F 17/0013* (2013.01); *H01F 17/04* (2013.01); *H01F 2017/048* (2013.01)

(58) Field of Classification Search

CPC ..................................................... H01F 27/292
USPC ......................................................... 336/200
See application file for complete search history.

(56) References Cited

U.S. PATENT DOCUMENTS

2010/0225437 A1* 9/2010 Ueda ....................... H01F 17/04 336/200
2014/0132383 A1 5/2014 Matsuura et al.
2014/0225703 A1* 8/2014 Otake ....................... H01F 1/33 336/221
2017/0140864 A1 5/2017 Arai et al.
2018/0114627 A1 4/2018 Arai et al.
2018/0358164 A1 12/2018 Arai et al.
2019/0156988 A1* 5/2019 Nakamura .......... H01F 27/2804
2019/0198210 A1 6/2019 Suzuki et al.
(Continued)

FOREIGN PATENT DOCUMENTS

JP 2012-238841 A 12/2012
JP 2017-092431 A 5/2017
(Continued)

*Primary Examiner* — Ronald Hinson
(74) *Attorney, Agent, or Firm* — Oliff PLC

(57) ABSTRACT

In a multilayer coil component, a part filled with a resin and a void part not filled with the resin exist between a plurality of metal magnetic particles in an element body, one main surface of the element body is a mounting surface with respect to an external electronic component, and the edge of an external electrode is positioned on the mounting surface. In the element body, a high void region where the porosity caused by the void part is higher than the porosity of the other part in the element body extends from the edge of the external electrode on the mounting surface toward an end surface of the element body.

6 Claims, 9 Drawing Sheets

(56) References Cited

U.S. PATENT DOCUMENTS

| | | | | |
|---|---|---|---|---|
| 2019/0237246 | A1* | 8/2019 | Wakabayashi ...... | H01F 27/2804 |
| 2020/0152370 | A1* | 5/2020 | Kang .................. | H01F 17/0013 |
| 2021/0035724 | A1* | 2/2021 | Sakai .................. | H01F 17/0013 |
| 2021/0335534 | A1 | 10/2021 | Kojo et al. | |
| 2022/0108836 | A1 | 4/2022 | Nagai et al. | |

FOREIGN PATENT DOCUMENTS

| | | | |
|---|---|---|---|
| JP | 2019-117898 | A | 7/2019 |
| JP | 2021-174937 | A | 11/2021 |
| JP | 2022-59883 | A | 4/2022 |

* cited by examiner

MULTILAYER COIL COMPONENT

TECHNICAL FIELD

The present disclosure relates to a multilayer coil component.

BACKGROUND

The coil component described in Japanese Unexamined Patent Publication No. 2012-238841 is an example of existing multilayer coil components. The element body of this existing coil component contains a plurality of metal particles made of a soft magnetic alloy. At least a part of a void that has resulted from metal particle accumulation is filled with a resin material.

SUMMARY

The multilayer coil component is mounted on a substrate by, for example, solder-joining an external electrode provided in an end portion of the element body to a land on the substrate side. After the mounting, stress may be generated in the multilayer coil component due to the bending of the substrate or the like. The element body may be cracked when excessive stress is applied to the multilayer coil component. Coil disconnection may arise when the crack proceeds into the element body and the crack reaches the coil in the element body.

The present disclosure has been made in order to solve the above problem, and an object of the present disclosure is to provide a multilayer coil component capable of suppressing coil disconnection attributable to a crack.

A multilayer coil component according to one aspect of the present disclosure includes: an element body containing a plurality of metal magnetic particles; a coil disposed in the element body; and an external electrode disposed so as to cover an end surface of the element body and electrically connected to the coil, in which a part filled with a resin and a void part not filled with the resin exist between the plurality of metal magnetic particles in the element body, one surface of the element body other than the end surface is a mounting surface with respect to an external electronic component and an edge of the external electrode is positioned on the mounting surface, and a high void region where porosity caused by the void part is higher than porosity of another part in the element body extends from the edge of the external electrode on the mounting surface toward the end surface of the element body in the element body.

In this multilayer coil component, the high void region extends from the edge of the external electrode on the mounting surface toward the end surface of the element body. The edge of the external electrode on the mounting surface can be the starting point of a crack at a time when the element body is excessively stressed. The porosity in the high void region is higher than the porosity of the other part of the element body, and thus the strength of the element body is relatively low in the high void region. Accordingly, in a case where the element body is cracked, the direction in which the crack proceeds is guided by the high void region from the starting point toward the end surface of the element body. By guiding the direction in which the crack proceeds toward the end surface of the element body, the possibility of the crack reaching the coil in the element body can be reduced and coil disconnection attributable to the crack can be suppressed.

The external electrode may be a baking electrode. In this case, the direction in which the crack proceeds can be more reliably guided toward the end surface of the element body. Accordingly, the possibility of the crack reaching the coil in the element body can be further reduced.

The high void region may extend to the end surface of the element body. The direction in which the crack proceeds can be more reliably guided toward the end surface of the element body. Accordingly, the possibility of the crack reaching the coil in the element body can be further reduced.

The high void region may be separated from the coil. As a result, the possibility of the crack reaching the coil in the element body can be further reduced.

DETAILED DESCRIPTION

Hereinafter, a preferred embodiment of a multilayer coil component according to one aspect of the present disclosure will be described in detail with reference to the drawings.

Figure 1:
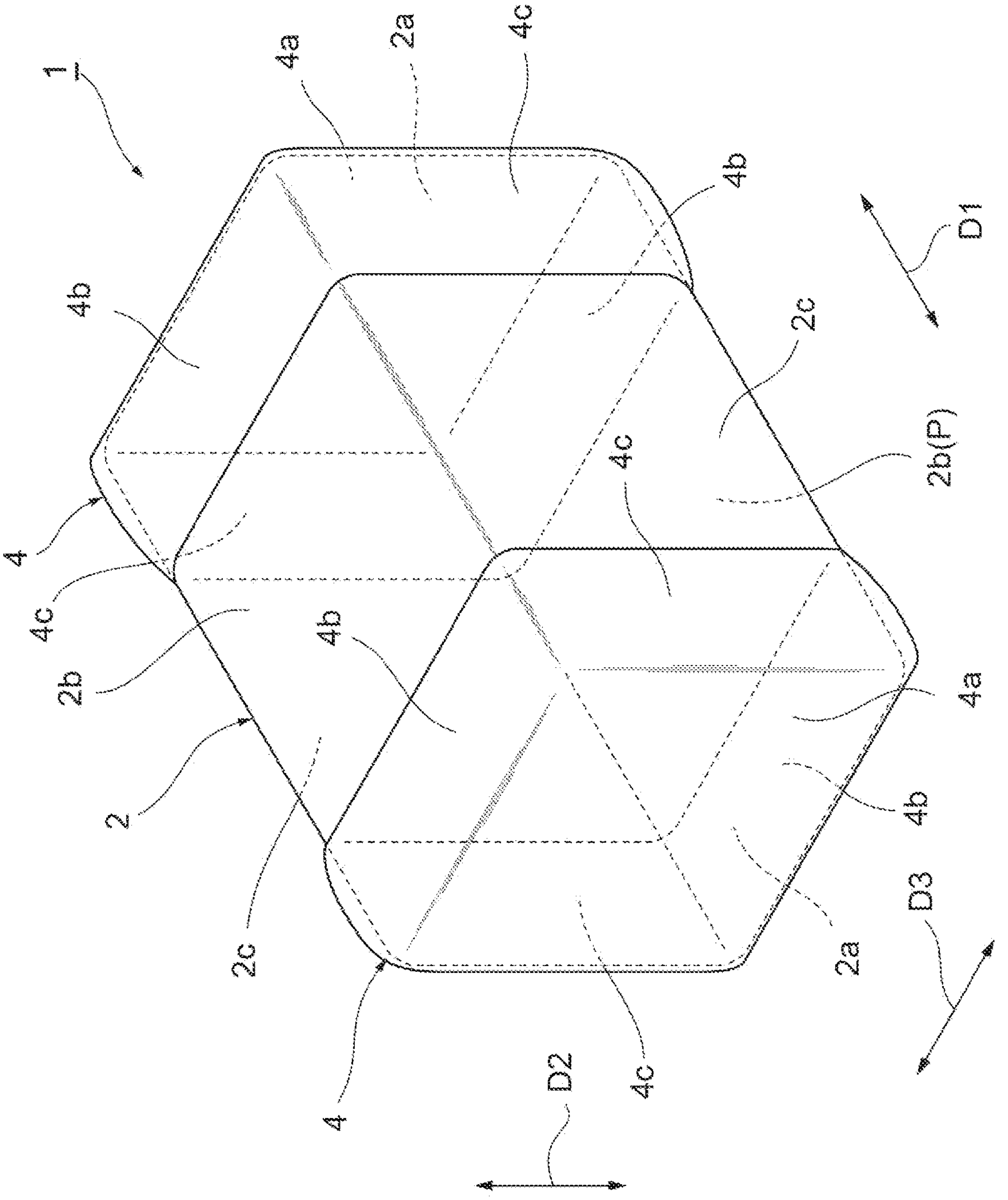
FIG. 1 is a perspective view illustrating an embodiment of a multilayer coil component.
Figure 2:
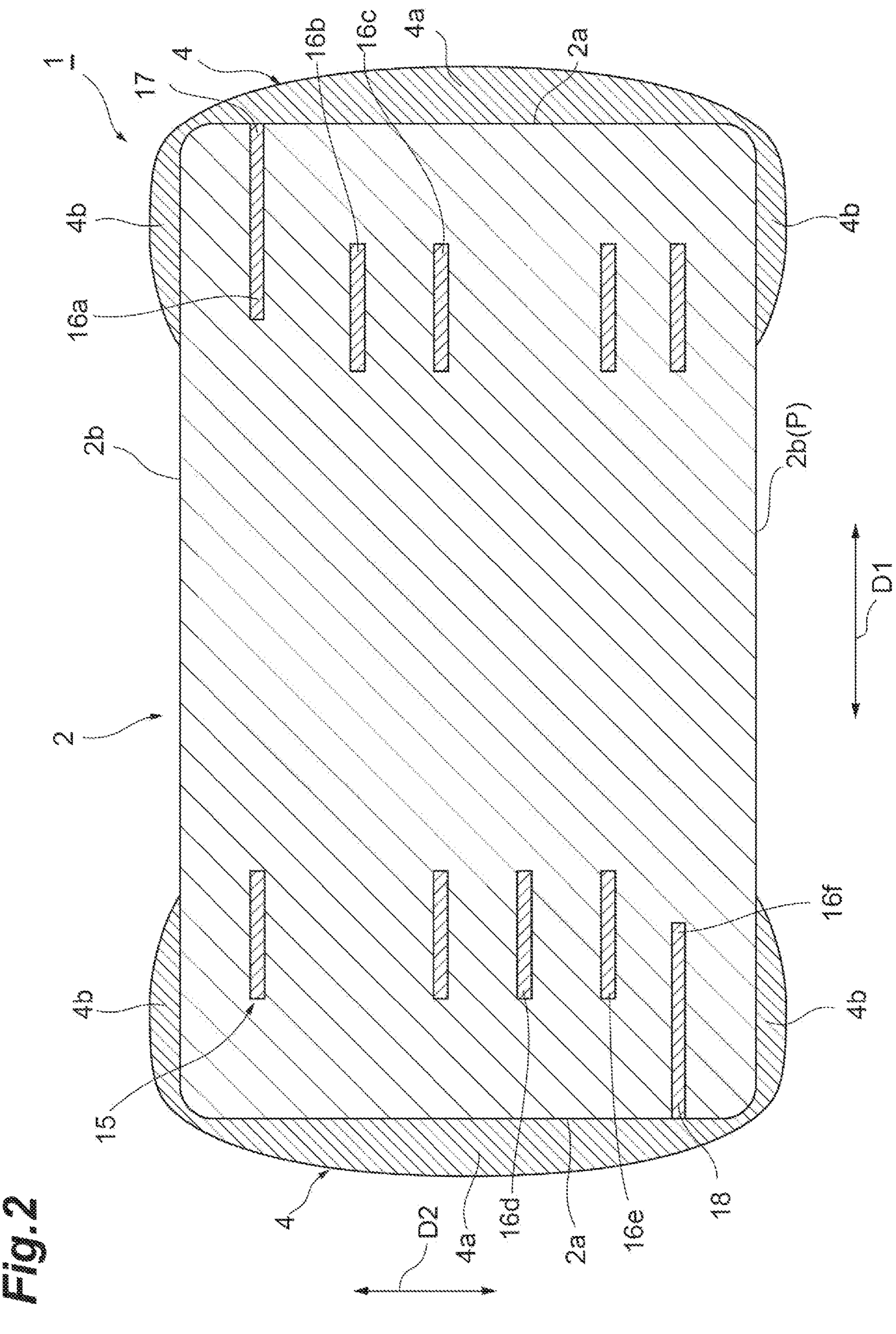
FIG. 2 is a diagram illustrating a cross-sectional configuration of the multilayer coil component illustrated in FIG. 1.
Figure 3:
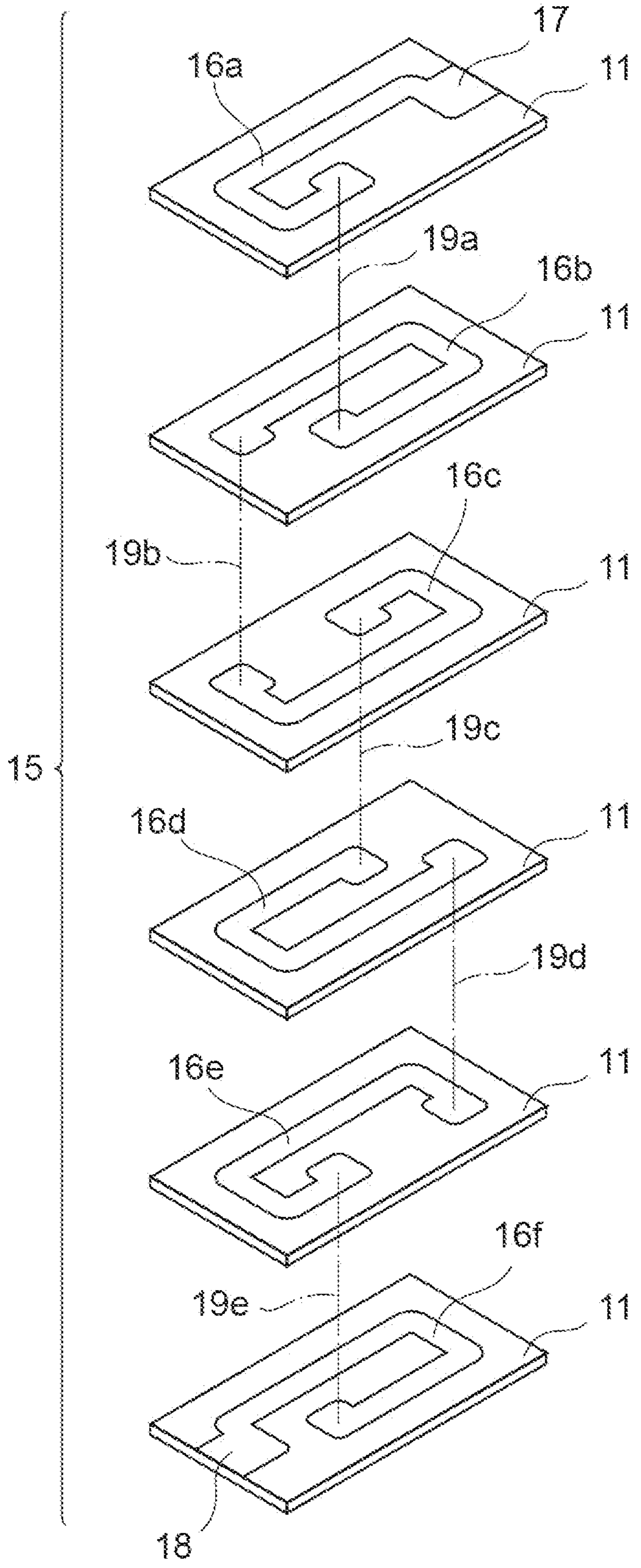
FIG. 3 is a perspective view illustrating the configuration of a coil.

The configuration of a multilayer coil component 1 according to the present embodiment will be described with reference to FIGS. 1 to 3. FIG. 1 is a perspective view illustrating an embodiment of a multilayer coil component. FIG. 2 is a diagram illustrating a cross-sectional configuration of the multilayer coil component illustrated in FIG. 1. FIG. 3 is a perspective view illustrating the configuration of a coil.

As illustrated in FIG. 1, the multilayer coil component 1 includes an element body 2 having a rectangular parallelepiped shape and a pair of external electrodes 4 and 4. The pair of external electrodes 4 and 4 are respectively disposed in both end portions of the element body 2 and are separated from each other. The rectangular parallelepiped shape includes a rectangular parallelepiped shape in which the corner and ridge portions are chamfered and a rectangular parallelepiped shape in which the corner and ridge portions are rounded. The multilayer coil component 1 can be applied to, for example, a bead inductor or a power inductor.

The rectangular parallelepiped element body 2 has a pair of end surfaces **2*a* and 2*a* facing each other, a pair of main surfaces 2*b* and 2*b* facing each other, and a pair of side surfaces 2*c* and 2*c* facing each other. The end surfaces 2*a*** and 2*a* are positioned so as to be adjacent to the pair of main surfaces 2*b* and 2*b*. In addition, the end surfaces 2*a* and 2*a* are positioned so as to be adjacent to the pair of side surfaces 2*c* and 2*c*. One of the main surfaces 2*b* (bottom surface in FIG. 1) is a mounting surface P. The mounting surface P faces another electronic device when the multilayer coil component 1 is mounted on the electronic device (such as a circuit board and an electronic component).

In the present embodiment, the facing direction of the pair of end surfaces 2*a* and 2*a* (first direction D1) is the length direction of the element body 2. The facing direction of the pair of main surfaces 2*b* and 2*b* (second direction D2) is the height direction of the element body 2. The facing direction of the pair of side surfaces 2*c* and 2*c* (third direction D3) is the width direction of the element body 2. The first direction D1, the second direction D2, and the third direction D3 are orthogonal to each other.

The length of the element body 2 in the first direction D1 is larger than the lengths of the element body 2 in the second direction D2 and the third direction D3. The length of the element body 2 in the second direction D2 is equivalent to the length of the element body 2 in the third direction D3. In other words, in the present embodiment, the pair of end surfaces 2*a* and 2*a* have a square shape and the pair of main surfaces 2*b* and 2*b* and the pair of side surfaces 2*c* and 2*c* have a rectangular shape.

The length of the element body 2 in the first direction D1 may be equivalent to the lengths of the element body 2 in the second direction D2 and the third direction D3. The length of the element body 2 in the second direction D2 may be different from the length of the element body 2 in the third direction D3. The equivalence includes, in addition to equality, a slight difference or a manufacturing error within a preset range. For example, a plurality of values may be regarded as equivalent insofar as the plurality of values are included in the range of 95% to 105% of the average value of the plurality of values.

The pair of end surfaces 2*a* and 2*a* extend in the second direction D2 so as to connect the pair of main surfaces 2*b* and 2*b*. The pair of end surfaces 2*a* and 2*a* also extend in the third direction D3 so as to connect the pair of side surfaces 2*c* and 2*c*. The pair of main surfaces 2*b* and 2*b* extend in the first direction D1 so as to connect the pair of end surfaces 2*a* and 2*a*. The pair of main surfaces 2*b* and 2*b* also extend in the third direction D3 so as to connect the pair of side surfaces 2*c* and 2*c*. The pair of side surfaces 2*c* and 2*c* extend in the first direction D1 so as to connect the pair of end surfaces 2*a* and 2*a*. The pair of side surfaces 2*c* and 2*c* also extend in the second direction D2 so as to connect the pair of main surfaces 2*b* and 2*b*.

The element body 2 is configured by laminating a plurality of magnetic body layers 11 (see FIG. 3). The magnetic body layers 11 are laminated in the facing direction of the main surfaces 2*b* and 2*b*. In other words, the lamination direction of the magnetic body layers 11 coincides with the facing direction of the main surfaces 2*b* and 2*b* (hereinafter, the facing direction of the main surfaces 2*b* and 2*b* will be referred to as "lamination direction"). Each magnetic body layer 11 has a substantially rectangular shape. In the actual element body 2, the magnetic body layers 11 are integrated to the extent that the boundaries between the layers cannot be visually recognized.

As illustrated in FIGS. 2 and 3, a coil 15 is disposed in the element body 2. The coil 15 includes a plurality of coil conductors 16*a* to 16*f*. The plurality of coil conductors 16*a* to 16*f* contain a conductive material (such as Ag or Pd). The plurality of coil conductors 16*a* to 16*f* are configured as sintered bodies of conductive paste containing a conductive material (such as Ag powder or Pd powder).

The coil conductor 16*a* includes a connecting conductor 17. The connecting conductor 17 is disposed on one end surface 2*a* side of the element body 2 and has an end portion exposed to one end surface 2*a*. The end portion of the connecting conductor 17 is exposed at a position close to one main surface 2*b* on one end surface 2*a* and is connected to one external electrode 4. In other words, the coil 15 is electrically connected to one external electrode 4 via the connecting conductor 17. In the present embodiment, the conductor pattern of the coil conductor 16*a* and the conductor pattern of the connecting conductor 17 are formed integrally and continuously.

The coil conductor 16*f* includes a connecting conductor 18. The connecting conductor 18 is disposed on the other end surface 2*a* side of the element body 2 and has an end portion exposed to the other end surface 2*a*. The end portion of the connecting conductor 18 is exposed at a position close to the other main surface 2*b* on the other end surface 2*a* and is connected to the other external electrode 4. In other words, the coil 15 is electrically connected to the other external electrode 4 via the connecting conductor 18. In the present embodiment, the conductor pattern of the coil conductor 16*f* and the conductor pattern of the connecting conductor 18 are formed integrally and continuously.

The plurality of coil conductors 16*a* to 16*f* are formed in the lamination direction of the magnetic body layers 11 in the element body 2. The plurality of coil conductors 16*a* to 16*f* are arranged in the order of the coil conductor 16*a*, the coil conductor 16*b*, the coil conductor 16*c*, the coil conductor 16*d*, the coil conductor 16*e*, and the coil conductor 16*f*. In the present embodiment, the coil 15 is configured by the part of the coil conductor 16*a* other than the connecting conductor 17, the plurality of coil conductors 16*b* to 16*d*, and the part of the coil conductor 16*f* other than the connecting conductor 18.

The end portions of the coil conductors 16*a* to 16*f* are connected to each other by through hole conductors 19*a* to 19*e*. The coil conductors 16*a* to 16*f* are electrically connected to each other by the through hole conductors 19*a* to 19*e*. The coil 15 is configured by electrically connecting the plurality of coil conductors 16*a* to 16*f*. Each of the through hole conductors 19*a* to 19*e* contains a conductive material (such as Ag or Pd). Each of the through hole conductors 19*a* to 19*e* is configured as a sintered body of conductive paste containing a conductive material (such as Ag powder or Pd powder) as in the case of the plurality of coil conductors 16*a* to 16*f*.

The external electrode 4 is disposed so as to cover the end portion of the element body 2 on the end surface 2*a* side. As illustrated in FIG. 1, the external electrode 4 has an electrode part 4*a* covering the end surface 2*a*, electrode parts 4*b* and 4*b* overhanging the pair of main surfaces 2*b* and 2*b*, and electrode parts 4*c* and 4*c* overhanging the pair of side surfaces 2*c* and 2*c*. In other words, the external electrode 4 is formed of the five surfaces formed by the electrode parts 4*a*, 4*b*, and 4*c*.

The electrode part 4*a* is disposed so as to cover the entire end portions of the connecting conductors 17 and 18 exposed on the end surface 2*a*, and the connecting conductors 17 and 18 are directly connected to the external electrode 4. In other words, the connecting conductors 17 and 18 connect the end portion of the coil 15 and the electrode part 4*a*. As a result, the coil 15 is electrically connected to the external electrode 4.

The electrode parts 4*a*, 4*b*, and 4*c* adjacent to each other are continuous and electrically connected in the ridge portion of the element body 2. The electrode part 4*a* and the electrode part 4*b* are connected in the ridge portion between the end surface 2*a* and the main surface 2*b*. The electrode part 4*a* and the electrode part 4*c* are connected in the ridge portion between the end surface 2*a* and the side surface 2*c*.

The external electrode 4 is configured to contain a conductive material. The conductive material is, for example, Ag or Pd. The external electrode 4 is a baking electrode and is configured as a sintered body of conductive paste. The conductive paste contains conductive metal powder and glass frit. The conductive metal powder is, for example, Ag powder or Pd powder. A plating layer is formed on the surface of the external electrode 4. The plating layer is formed by, for example, electroplating. The electroplating is, for example, electric Ni plating or electric Sn plating.

Next, the configuration of the element body 2 described above will be described in more detail.

Figure 4:
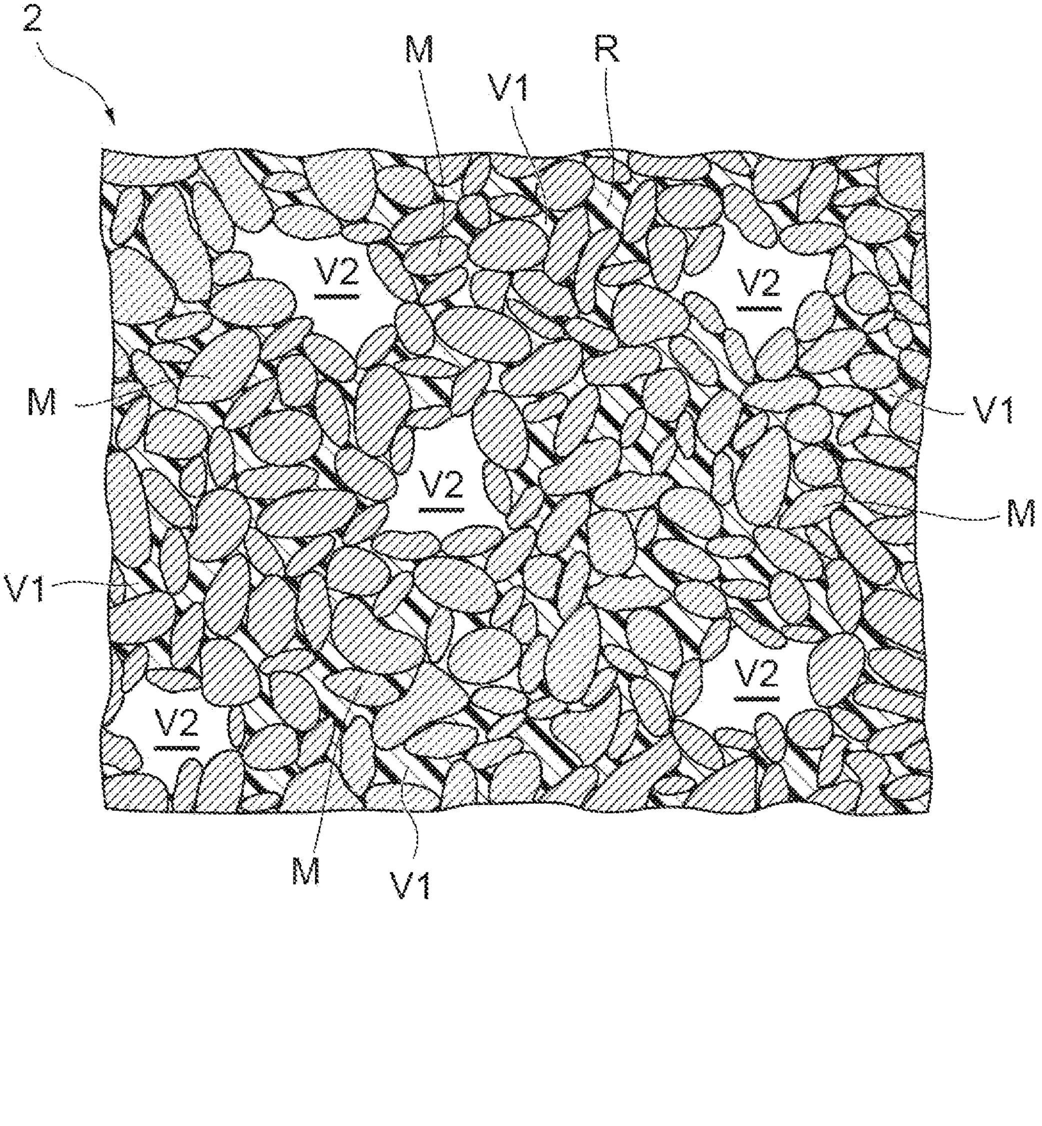
FIG. 4 is an enlarged schematic view illustrating a cross-sectional configuration of an inner portion of an element body.

FIG. 4 is an enlarged schematic view illustrating a cross-sectional configuration of the inner portion of the element body. As illustrated in the drawing, the element body 2 contains a plurality of metal magnetic particles M. The metal magnetic particles M are made of, for example, a soft magnetic alloy. The soft magnetic alloy is, for example, a Fe—Si-based alloy. In a case where the soft magnetic alloy is the Fe—Si-based alloy, the soft magnetic alloy may contain P. The soft magnetic alloy may be, for example, a Fe—Ni—Si-M-based alloy. "M" contains one or more elements selected from Co, Cr, Mn, P, Ti, Zr, Hf, Nb, Ta, Mo, Mg, Ca, Sr, Ba, Zn, B, Al, and rare earth elements.

In the element body 2, the metal magnetic particles M and M are bonded to each other. The metal magnetic particles M and M are bonded to each other by, for example, the oxide films formed on the surfaces of the metal magnetic particles M being bonded to each other.

The average particle diameter of the metal magnetic particles M is, for example, 0.5 μm to 15 μm. In the present embodiment, the average particle diameter of the metal magnetic particles M is 5 μm. "Average particle diameter" means the particle diameter at an integrated value of 50% in a particle size distribution obtained by a laser diffraction/scattering method.

As illustrated in FIG. 4, the element body 2 contains a resin R. The resin R exists between the plurality of metal magnetic particles M and M. The resin R is a resin that has electrical insulation. A silicone resin, a phenol resin, an acrylic resin, an epoxy resin, or the like is used as the resin R. The resin R does not completely fill the space between the plurality of metal magnetic particles M and M in the element body 2. Accordingly, in the element body 2, a part V1 filled with the resin R and a void part V2 not filled with the resin R exist between the plurality of metal magnetic particles M and M.

Figure 5:
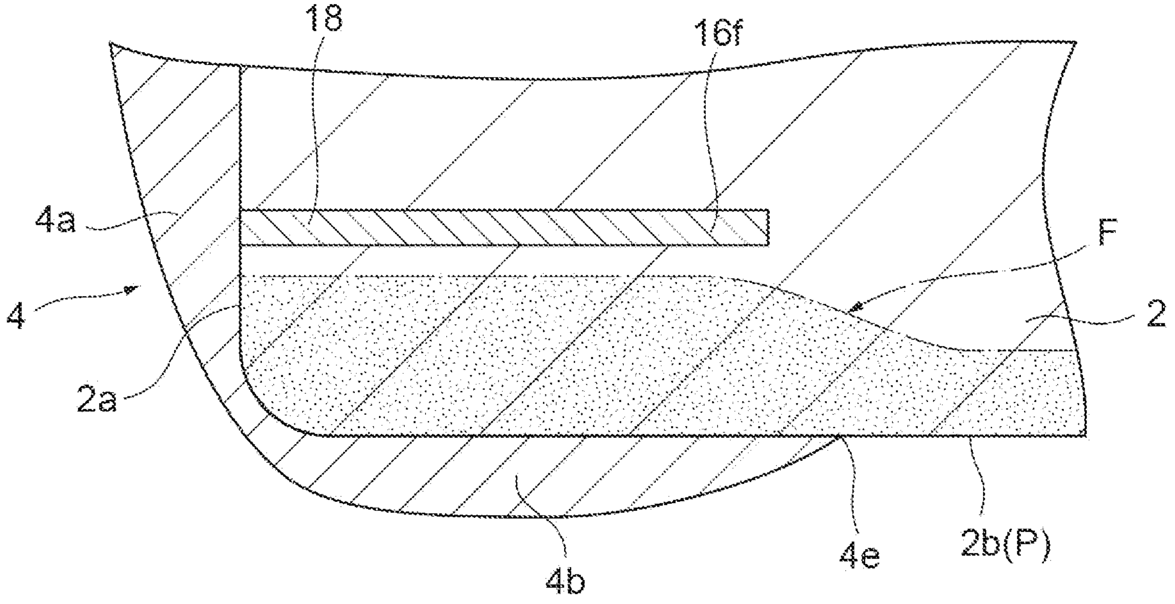
FIG. 5 is a schematic cross-sectional view illustrating how a high void region is disposed in the element body.

Provided in the element body 2 is a high void region F where the porosity caused by the void part V2 is higher than the porosity of the other part in the element body 2. As illustrated in FIG. 5, the high void region F extends from an edge 4*e* of the external electrode 4 on the mounting surface P toward the end surface 2*a* of the element body 2. The edge 4*e* of the external electrode 4 is the tip of the electrode part 4*b* overhanging the mounting surface P, which is one of the pair of main surfaces 2*b* and 2*b*. The high void region F includes the part of the mounting surface P with which the edge 4*e* of the external electrode 4 is in contact, extends in the first direction D1 from the part, and extends so as to reach the end surface 2*a* of the element body 2. In addition, in the present embodiment, the high void region F extends so as to include the part of the mounting surface P that is in contact with the external electrode 4. Accordingly, the high void region F extends so as to reach the corner portion formed by the end surface 2*a* and the mounting surface P. Although one external electrode 4 side is illustrated in an enlarged manner in FIG. 5, the other external electrode 4 side has the same configuration.

The formation depth of the high void region F from the mounting surface P is smaller than the distance in the second direction D2 from the mounting surface P to the coil conductor 16*f* closest to the mounting surface P. As a result, the high void region F is in a state of being separated from the coil 15 in the element body 2. The formation depth of the high void region F from the mounting surface P may be constant in the first direction D1 or may gradually decrease from the edge 4*e* of the external electrode 4 toward the end surface 2*a*. The formation depth of the high void region F from the mounting surface P may gradually increase from the edge 4*e* of the external electrode 4 toward the end surface 2*a*.

Figure 6:
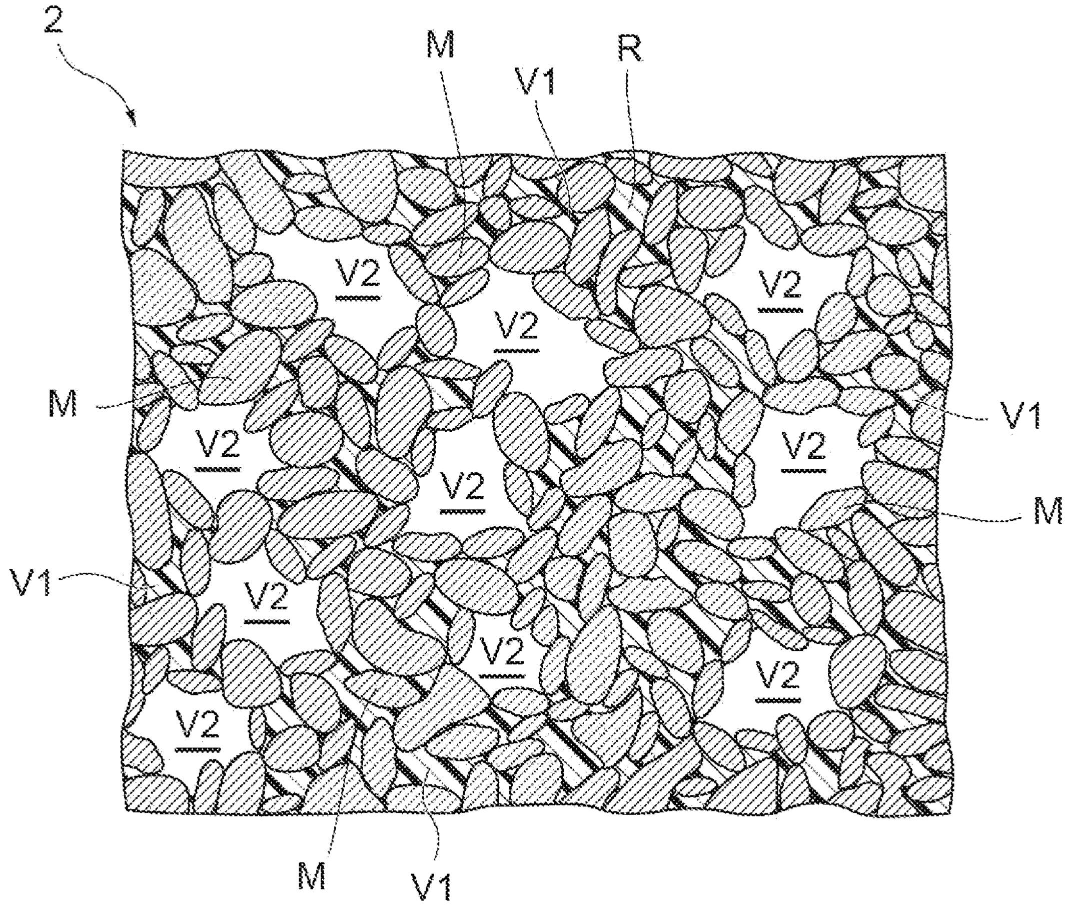
FIG. 6 is an enlarged schematic view illustrating a cross-sectional configuration of the high void region.

As illustrated in FIG. 6, the high void region F is similar to the other part of the element body 2 in that the resin R exists between the plurality of metal magnetic particles M and M. In addition, the high void region F is similar to the other part of the element body 2 in that the void part V2 exists in at least a part of the space between the plurality of metal magnetic particles M and M. On the other hand, the porosity in the high void region F is approximately 30% whereas the porosity at the other part of the element body 2 is, for example, less than 10%. The porosity can be calculated by, for example, magnifying the cross section of the element body 2 by a factor of 3000 with a scanning electron microscope (SEM) and obtaining the ratio of the area of the void part V2 to the area of the cross section of the element body 2.

Figure 7:
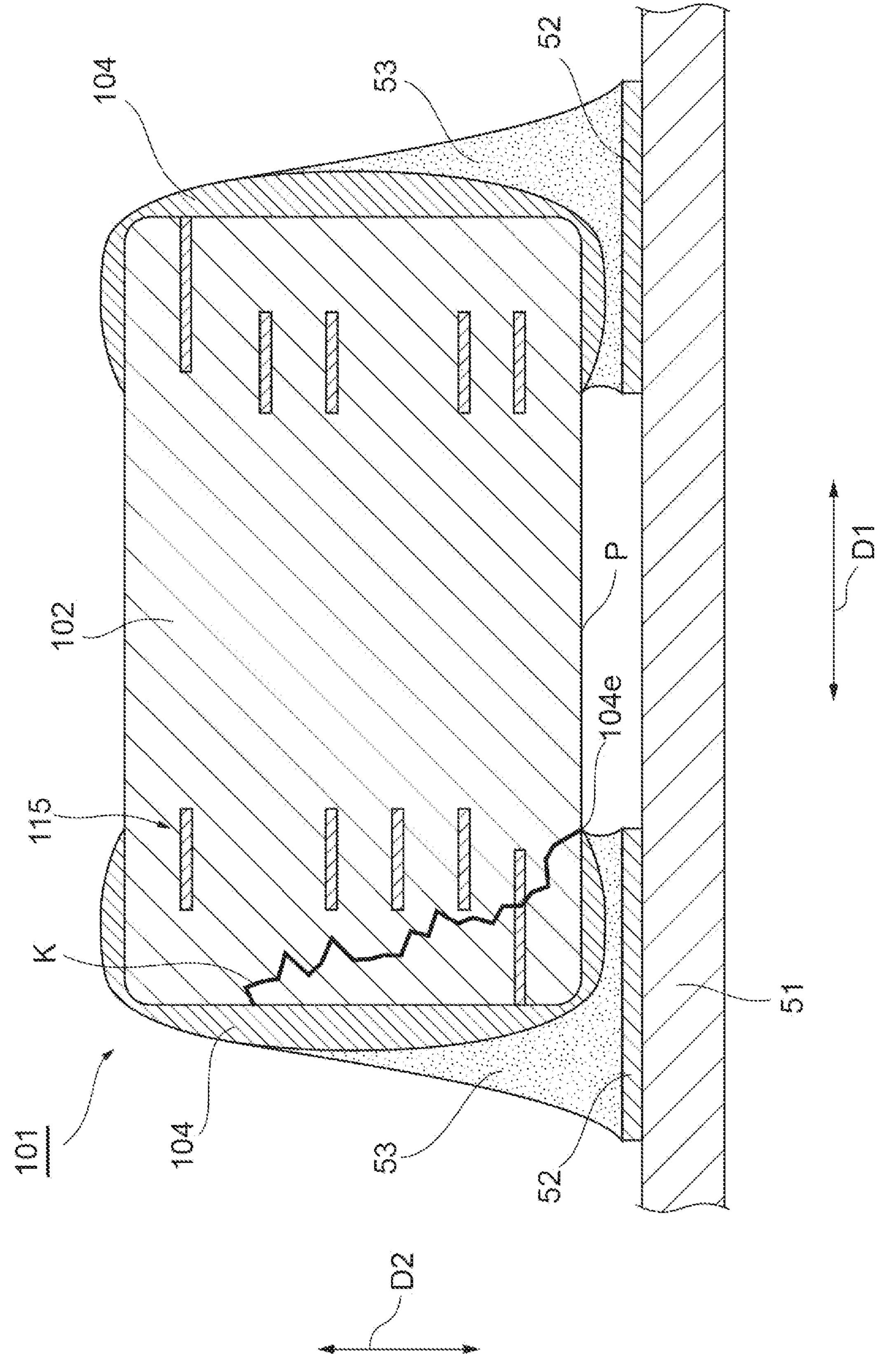
FIG. 7 is a schematic cross-sectional view illustrating how a crack proceeds in a multilayer coil component of a comparative example not provided with a high void region.

In a case where the element body 2 is cracked, the high void region F acts to guide the direction in which the crack proceeds. FIG. 7 is a schematic cross-sectional view illustrating how a crack proceeds in a multilayer coil component of a comparative example not provided with a high void region. As illustrated in the drawing, a multilayer coil component 101 according to the comparative example is different from the multilayer coil component 1 according to the example in that an element body 102 is not provided with the high void region F. In the multilayer coil component 101, the porosity is less than 10% over the entire element body 102. The multilayer coil component 1 is mounted on a substrate 51 by joining a land 52 on the substrate 51 side and an external electrode 104 with solder 53.

After the mounting, stress may be generated in the multilayer coil component 101 due to the bending of the substrate 51 or the like. When excessive stress is applied to the multilayer coil component 101, a crack K may be generated in the element body 102. At this time, an edge 104*e* of the external electrode 104 on the mounting surface P can be the starting point of the crack K at the time when the element body 102 is excessively stressed. In the multilayer coil component 101, in which the element body 102 is not provided with the high void region F, it is difficult to predict the direction in which the crack K proceeds in the element body 102. When the crack K proceeds in the second direction D2 from the starting point as illustrated in FIG. 7, it is conceivable that the crack K reaches the coil 15 in the element body 102 and a coil 115 is disconnected.

Figure 8:
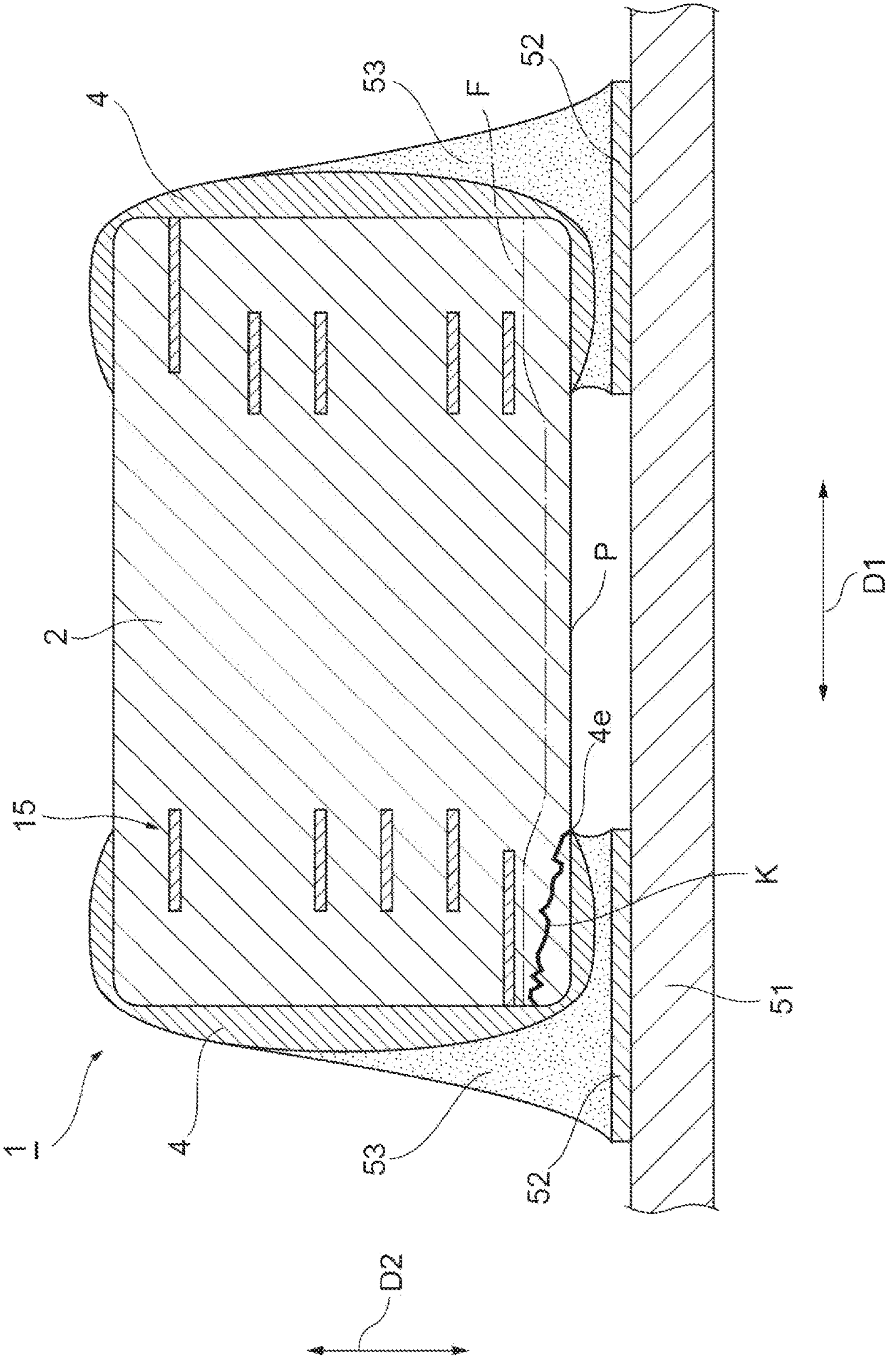
FIG. 8 is a schematic cross-sectional view illustrating how a crack proceeds in the multilayer coil component of the example provided with the high void region.

On the other hand, in the multilayer coil component 1 in which the element body 2 is provided with the high void region F, the strength of the element body 2 in the high void region F is relatively lower than the strength of the other part of the element body 2. Accordingly, in a case where the crack K is generated in the element body 2 in the multilayer coil component 1, the direction in which the crack K proceeds is guided by the high void region F from the starting point toward the end surface 2*a* of the element body 2 as illustrated in FIG. 8. By guiding the direction in which the crack K proceeds toward the end surface 2*a* of the element body 2 provided with the external electrode 4, the possibility of the crack K reaching the coil 15 in the element body 2 can be reduced and coil disconnection attributable to the crack K can be suppressed.

In the present embodiment, the external electrode 4 is a baking electrode. As a result, the direction in which the crack K proceeds can be more reliably guided toward the end surface 2*a* of the element body 2 provided with the external electrode 4. In the present embodiment, the high void region F extends to the end surface 2*a* of the element body 2. As a result, the direction in which the crack K proceeds can be more reliably guided to the end surface 2*a* of the element body 2. Accordingly, the possibility of the crack K reaching the coil 15 in the element body 2 can be further reduced. In the present embodiment, the high void region F is separated from the coil 15. As a result, the crack K proceeding toward the coil 15 can be avoided and the possibility of the crack K reaching the coil 15 in the element body can be further reduced.

The present disclosure is not limited to the embodiment described above. For example, the high void region F may have a part extending in the first direction D1 from the edge 4*e* of the external electrode 4 toward the middle side (side opposite to the end surface 2*a*) of the element body 2 (see FIG. 5). The formation depth of the high void region F from the mounting surface P at the part may be equal to the formation depth of the high void region F extending from the edge of the external electrode 4 toward the end surface 2*a* of the element body 2 or may gradually decrease as the distance from the edge 4*e* of the external electrode 4 increases.

The high void region F may have a part extending from the edge 4*e* of the external electrode 4 toward the end surface 2*a* of the element body 2 and does not necessarily have to extend to the end surface 2*a*. The external electrode 4 is not limited to the baking electrode and may be a resin electrode. The resin electrode is an electrode configured by mixing a thermosetting resin with conductor powder and an organic solvent or the like. A silicone resin, a phenol resin, an acrylic resin, an epoxy resin, a polyimide resin, or the like is used as the thermosetting resin. Ag powder or the like is used as the conductor powder.

In the magnetic body layer 11, non-magnetic ceramic particles smaller in diameter than the metal magnetic particles M may exist in at least a part of the space between the plurality of metal magnetic particles M and M.

Figure 9:
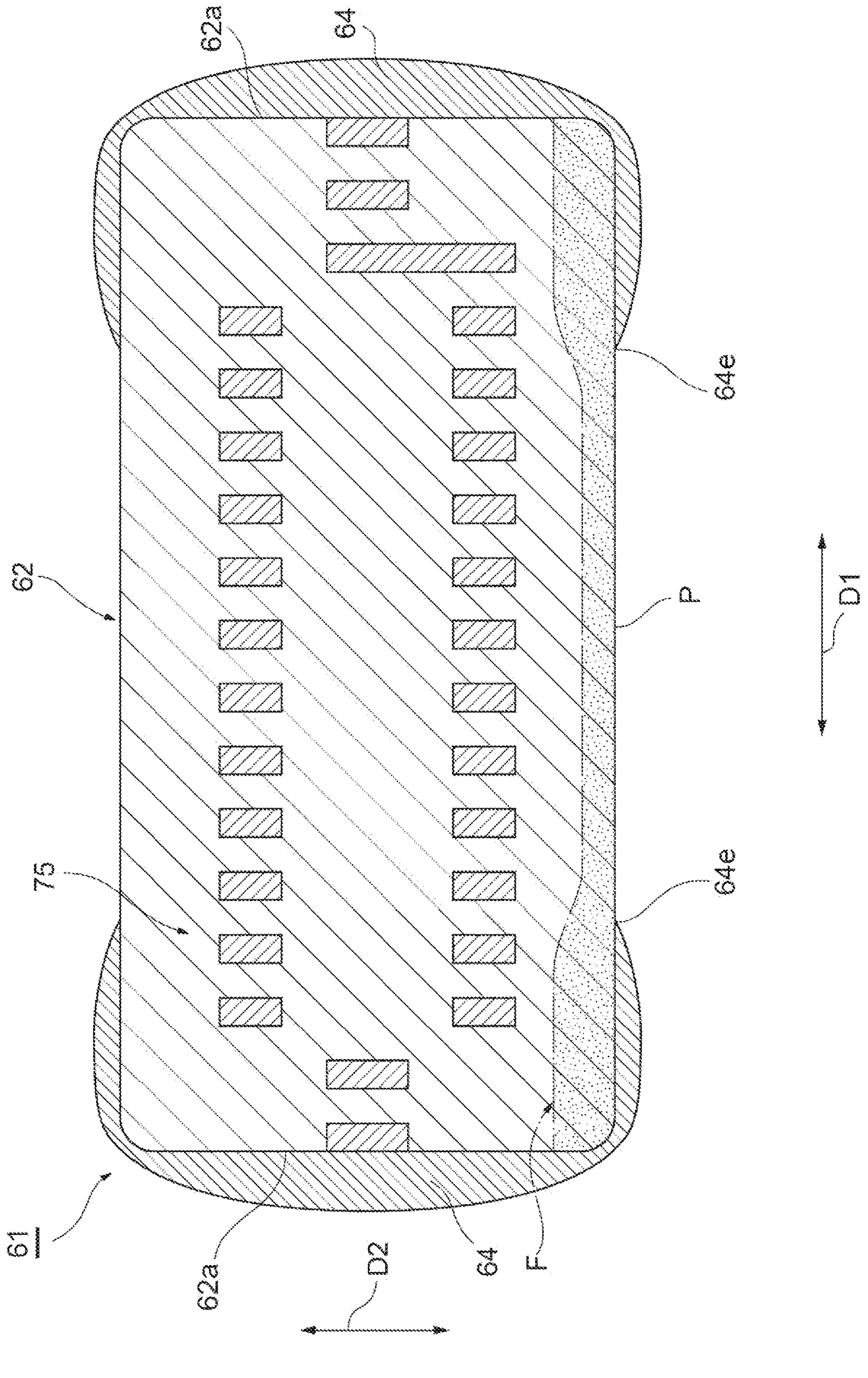
FIG. 9 is a diagram illustrating a cross-sectional configuration of a multilayer coil component according to a modification example.

In the embodiment described above, the main surface 2*b* of the element body 2 is the mounting surface P and the lamination direction of the magnetic body layers 11 and the normal direction of the mounting surface P coincide with each other. In an alternative aspect, the lamination direction of the magnetic body layers and the normal direction of the mounting surface may intersect with (be orthogonal to) each other as illustrated in, for example, FIG. 9. In a multilayer coil component 61 illustrated in FIG. 9, external electrodes 64 are respectively provided so as to cover end surfaces 62*a* and 62*a* of an element body 62 and the lamination direction of the magnetic body layers coincides with the direction in which the end surfaces 62*a* and 62*a* of the element body 62 are connected to each other. In other words, in the multilayer coil component 61, the direction in which a coil 75 is formed in the element body 62 coincides with the direction in which the end surfaces 62*a* and 62*a* of the element body 62 are connected to each other and is orthogonal to the normal direction of the mounting surface P. The multilayer coil component 61 is similar in action and effect to the embodiment described above by providing the high void region F extending from an edge 64*e* of the external electrode 64 on the mounting surface P toward the end surface 62*a* of the element body 62.

What is claimed is:

1. A multilayer coil component comprising:

an element body containing a plurality of metal magnetic particles;

a coil disposed in the element body; and an external electrode disposed so as to cover an end surface of the element body and electrically connected to the coil, wherein a part filled with a resin and a void part not filled with the resin exist between the plurality of metal magnetic particles in the element body, one surface of the element body other than the end surface is a mounting surface with respect to an external electronic component and an edge of the external electrode is positioned on the mounting surface, a high void region where porosity caused by the void part is higher than porosity of another part in the element body extends from the edge of the external electrode on the mounting surface toward the end surface of the element body in the element body, and the high void region has a formation depth extending from the mounting surface along a direction orthogonal to the mounting surface, and the formation depth of the high void region increases from the edge of the external electrode toward the end surface.

2. The multilayer coil component according to claim 1, wherein the external electrode is a baking electrode.

3. The multilayer coil component according to claim 1, wherein the high void region extends to the end surface of the element body.

4. The multilayer coil component according to claim 1, wherein the high void region is separated from the coil.

5. The multilayer coil component according to claim 1, wherein:

the element body extends in a first direction between the end surface and an opposite end surface of the element body, and extends in a second direction from the mounting surface to an opposite surface of the element body, the first direction being orthogonal to the second direction, the formation depth of the high void region extends along the second direction from the mounting surface towards the opposite surface, and the formation depth of the high void region increases along the first direction from the edge of the external electrode toward the end surface.

6. The multilayer coil component according to claim 5, wherein the formation depth of the high void region is smaller than a distance along the second direction from the mounting surface to the coil.

* * * * *